United States Patent [19]

Leiber

[11] Patent Number: 4,625,824
[45] Date of Patent: Dec. 2, 1986

[54] METHOD AND APPARATUS TO CONTROL SLIPPAGE OR SPINNING OF DRIVEN WHEELS OF A VEHICLE

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 726,412

[22] Filed: Apr. 24, 1985

[30] Foreign Application Priority Data

May 3, 1984 [DE] Fed. Rep. of Germany ....... 3416292

[51] Int. Cl.[4] .............................................. B60T 8/04
[52] U.S. Cl. ..................................... 180/197; 303/96; 303/97
[58] Field of Search .................... 180/197; 303/95, 97, 303/106, 111, 96, 99

[56] References Cited

U.S. PATENT DOCUMENTS

3,706,351 12/1972 Neisch ................................... 303/96
4,486,839 12/1984 Mazur et al. ...................... 303/95 X Primary Examiner—John A. Pekar
Attorney, Agent, or Firm—Frishauf, Holtz, Goodman, Woodward

[57] ABSTRACT

To prevent undue low operating speed of an automotive vehicle engine if slippage of a driven wheel is sensed, the speeds of the driven wheels are sensed, and, when one of the driven wheels first exceeds a reference level, a braking effort is applied thereto, the other wheel, however, being permitted to slip or spin until the other wheel has reached either a predetermined speed, at which it is then selectively braked, or the engine has reached a predetermined engine speed level ($n_{min}$), after which time the other wheel then can also be braked, or the spinning decreases due to lesser power being applied by the engine.

10 Claims, 3 Drawing Figures

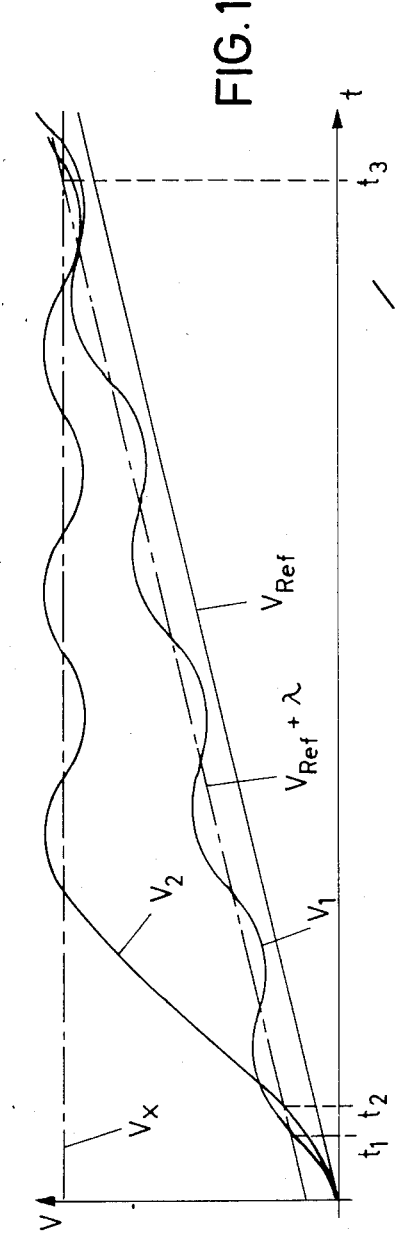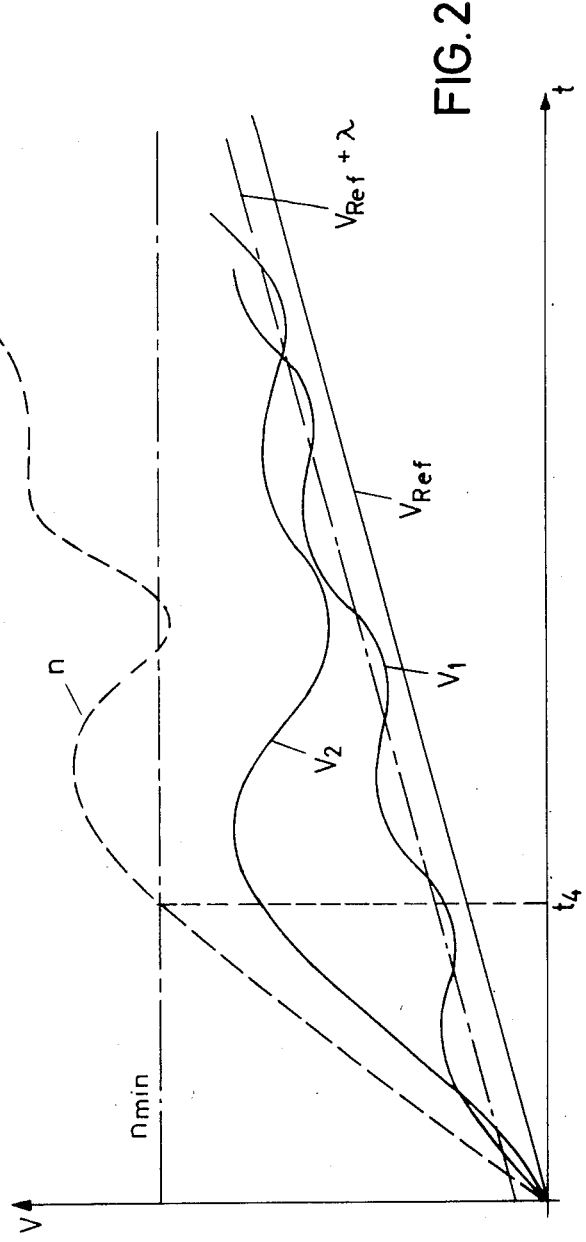

METHOD AND APPARATUS TO CONTROL SLIPPAGE OR SPINNING OF DRIVEN WHEELS OF A VEHICLE

Reference to related publication:
German Patent Disclosure Document No. DE-OS 31 27 301 to which British Pat. No. 2,109,882 corresponds.

The present invention relates to a control apparatus, and a control method, to control slippage or spinning of driven wheels of a vehicle, and more particularly to control slip or spinning of driven wheels automatically by, selectively, applying a brake on one or more of slipping driven wheels and, also, controlling engine torque.

BACKGROUND

It has been proposed to sense wheel speed and generate wheel speed signals which are then processed to compare the driven speed of the wheels with the speed of the vehicle and, if the wheel speed is in excess of that which it should have to drive the vehicle, a signal is generated which can be used to apply a brake to the wheel which spins or slips or has a tendency to spin or slips or effect other control functions, for example to reduce torque output from the engine to which the wheels are coupled. The referenced literature, German Patent Disclosure Document No. DE-OS 31 27 301 to which British Pat. No. 2,109,882 corresponds, describes a control circuit of this type. If a wheel tends to spin, the associated brake is operated by a brake control system. If two wheels, for example from the same axle, have a tendency to spin, then, additionally, the engine torque can be affected.

Vehicles which have control systems of this type, particularly vehicles which have manual transmissions, may be difficult to start if the surface on which the wheels are located is highly slippery, that is, the coefficient of friction between wheel and road surface is low. The engine may not reach a sufficiently high speed, or may reach the sufficiently high speed not fast enough in order to permit reliable starting of the vehicle on the surface.

THE INVENTION

It is an object to provide a control method to insure that wheels of a vehicle are properly controlled to permit moving the vehicle, even though some slippage of wheels may occur.

Briefly, respective driven wheel speed and vehicle speed signals are generated, as well known. The output torque of the engine is controlled in a direction to reduce output therefrom, and hence to reduce engine speed in dependence on the presence of wheel slip signals from at least one of the wheels. In accordance with a feature of the invention, and to insure that, reliably, the engine reaches sufficient speed so that the vehicle may move from a stopped position, or can be properly operated, only one of the driven wheels from which first a wheel slip signal is derived is subjected to braking, while the other driven wheel is left uncontrolled, permitting slippage thereof. Interference with torque of the engine is, in systems of this kind, controlled only if both wheels slip, for example uncontrollably. The engine will be controlled towards reduction of torque to only to an extent which does not interfere with the engine reaching sufficient speed to move the vehicle and cause gripping of the wheel which is being braked.

DRAWINGS

FIG. 1 is a graph, with respect to a time axis (abscissa) illustrating vehicle speed, and speed of the driven wheels, in accordance with one mode of control;

FIG. 2 is a graph similar to FIG. 1, illustrating another mode of control; and

DETAILED DESCRIPTION

Figure 3:
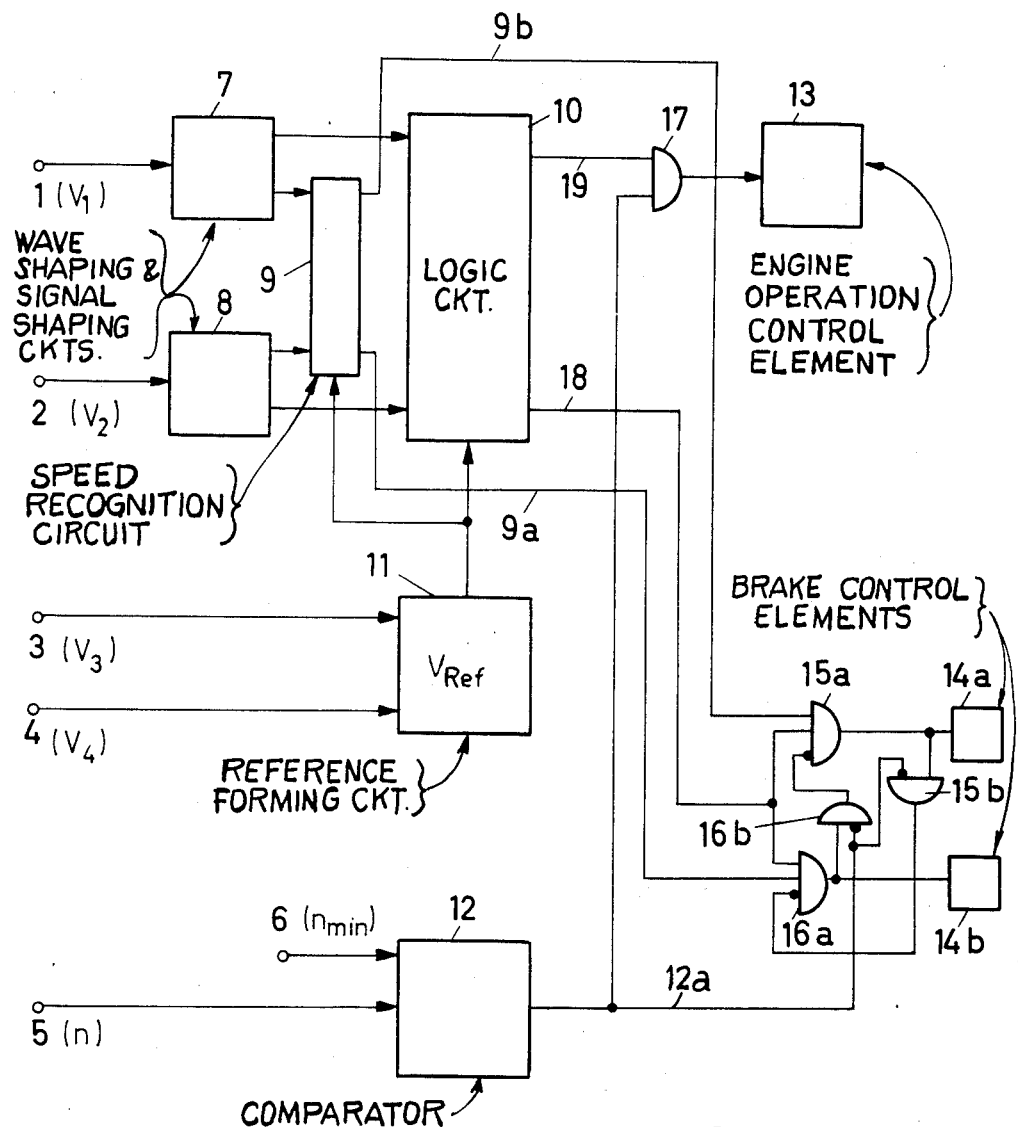
FIG. 3 is a block circuit diagram of a control system carrying out the method of the present invention.

A vehicle speed curve is shown in FIG. 1, in full-line representation as $V_{Ref}$ representing, for example, the actual speed of the vehicle. A response threshold, represented by the chain-dotted line $V_{Ref}+\lambda$ is drawn parallel to the line $V_{Ref}$, in which $\lambda$ is the slippage permitted to a wheel, and which, in the present example, may be considered to be constant. Let it be assumed that the road surface has a low coefficient of friction with respect to the wheel. The first wheel, the speed of which is shown at $V_1$, rapidly exceeds the speed of the vehicle and, also, of the modified or response threshold speed $V_{Ref}+\lambda$, already at time $t_1$. As soon as the actual wheel speed $V_1$, at time $t_1$, exceeds the response threshold, the wheel will be braked by applying suitable braking pressure to the associated brake, so that the wheel speed will follow, at least roughly, the threshold, and undulate thereabout, as shown by the solid-line curve $V_1$ in FIG. 1.

In a conventional control unit, the second wheel, typically on the same axle, and likewise driven, would rapidly exceed the threshold curve. The speed of the second wheel is shown by the solid-line curve $V_2$, and, in a conventional system, this wheel, likewise, would be subject to braking as soon as its speed exceeds the threshold, which occurs at time $t_2$, as seen in FIG. 1. Additionally, or alternatively, the engine would be controlled to reduce the torque output thereof, for example by closing a throttle valve, decreasing fuel supply, or the like; alternatively, the ignition timing can also be changed. Reducing the power available to the vehicle engine will cause the engine to remain in a speed range which will be too slow for too long a period of time.

In accordance with a feature of the invention, control of the second wheel which spins, or has a tendency to spin or slip, is inhibited or interfered with, so that the second wheel can slip or spin to a much greater extent. Blocking of the braking effect or effort applied to the second wheel permits the second wheel to accelerate until the second wheel reaches a second threshold level shown by the flat chain-dotted threshold line $V_x$. This line $V_x$ is so placed on the speed range that the engine will have sufficient speed. In other words, only when the engine has reached a speed sufficient for suitable operation of the vehicle will braking of the second wheel be controlled, as shown by the undulation of the solid-line curve $V_2$ about the second threshold $V_x$. The speed $V_2$ of the respective second wheel is, thus, controlled about the threshold $V_x$ until the two response threshold levels $V_{Ref}+\lambda$ and $V_x$ meet at the time $t_3$. From that time on, the control can revert to normal operation, that is, the wheel having the speed $V_2$ can then be controlled in accordance with the threshold level $V_{Ref}+\lambda$ by braking both wheels, and, additionally, if desired and appropriate, controlling torque of the engine. The engine torque may also be controlled within the control range when the second wheel is controlled to operate about the second threshold $V_x$. The engine can be controlled, for example, by controlling fuel thereto, throttle position, ignition timing or the like.

Braking can be effected directly by controlling the brakes of the respective wheel or, if the vehicle is equipped with a no-slip or locking differential, the differential may be controlled, for example electronically, to prevent slippage of one of the wheels. In such an arrangement, rather than controlling the brake, the locking mechanism of the no-slip or locking differential is affected by a suitable control or positioning element.

The operating mode in accordance with FIG. 2 differs from that in accordance with FIG. 1 in that the engine speed is used as the reference for the control of the second wheel. The identification of the graphs in FIG. 2 is the same as that in FIG. 1. The first wheel which has a tendency to slip or spin is controlled about the threshold $V_{Ref}+\lambda$. In accordance with a feature of the invention, the wheel which is the second one to slip, and having the speed $V_2$, is not controlled, however, but initially remains uncontrolled and, hence, rapidly reaches a higher speed. Control for that second wheel is initiated only when the engine speed n exceeds a predetermined level $n_{min}$, which, in the example assumed, occurs at time $t_4$. FIG. 2 also shows engine speed n in broken-line representation. Thus, interference with engine torque and/or braking for the second wheel will occur only after time $t_4$. As seen in FIG. 2, and particularly in the curve n, both the engine may be decelerated—see the dropping characteristic of the curve n after $t_4$, as well as braking of the second wheel. Engine speed signals can be derived, as well known, from a suitable transducer responsive to the speed of the engine itself. As before, the wheel speed may be regulated by applying brakes to the wheels, and/or controlling a locking or no-slip differential.

Apparatus, with reference to FIG. 3:

The system of FIG. 3 operates in accordance with the method of FIG. 2. Input terminals 1 and 2 receive wheel speed signals $V_1$ and $V_2$ from driven wheels. Terminals 3, 4 receive wheel speed signals from two other wheels, namely the signals $V_3$ and $V_4$. These signals are used to generate a vehicle speed or reference signal. A terminal 5 receives engine speed signals, and a terminal 6 an engine threshold or reference signal $n_{min}$, corresponding to the threshold level $n_{min}$ as shown in FIG. 2. The signal at terminal 6 may be a fixed signal, for example derived from a fixed reference source. The signals from terminals 1 and 2 are applied to wave shaping or signal processing circuits 7, 8, respectively, which may, if desired, include analog/digital converters, to provide output signals therefrom suitable for processing in the system as illustrated. The signals from the wave-shaping circuits and signal shaping and processing circuits are applied, on the one hand, to a recognition circuit 9, which recognizes which one of the signals $V_1$ or $V_2$ first tends to slip, that is, which one of the signals has, initially, a higher speed than the other. The outputs from the wave shaping and signal shaping circuits 7,8 are, additionally, applied to a logic circuit 10. The logic circuit 10 compares the respective signals with a reference derived from the signals $V_3$ and $V_4$ from terminals 3, 4.

The signals from terminals 3 and 4 are applied to a speed reference forming circuit 11 which generates the signal $V_{Ref}$, representative of vehicle speed, and providing an output to which, already in the circuit 11, the additional value $\lambda$ can be added. The circuit 12 provides an output signal when the engine speed n is higher than a predetermined minimum speed $n_{min}$.

The output from the circuit is applied to a positioning element 13 which controls operation of the engine, for example by changing the throttle position of the engine; element 13, thus, forms an engine operation control element. The blocks 14a, 14b represent, respectively, control elements for brakes of the wheels associated, respectively, with the wheels generating the signals $V_1$ and $V_2$, respectively. Alternatively, the elements 14a, 14b may be control elements associated with a slip controlled or locking differential to control slip or locking or no-slip condition of the controlled differential. For simplicity of the drawing, the blocks 14a, 14b are merely labeled as "BRAKE CONTROL ELEMENTS", it being understood that the brake may be applied to the wheels or to the differential, for example. AND-gate 17 and logic gates 15a, 15b, 16a, 16b, additionally, are provided for logically interrelating the respective signals as will appear.

Operation:

The signals provided by the wave-shaping and signal shaping circuits 7, 8 are applied to the speed recognition circuit 9 as well as the logic circuit 10, for handling of the respective signals. The logic circuit 10 also has the speed reference signal $V_{Ref}$ applied thereto, and generates output signals on respective output lines if:

(a) one of the wheel speeds exceeds the threshold $V_{Ref}+\lambda$—line 18;

(b) both the speeds $V_1$ and $V_2$ exceed the reference level—line 19.

Additionally, the recognition circuit 9 determines which one of the wheels, that is, which one of the signals $V_1$, $V_2$ first has a tendency to slip, that is, exceeds the reference derived from reference forming circuit 11. In dependence on which one of the wheels first tends to slip, one, or the other of the output lines 9a, 9b from the speed recognition circuit 9 will have a signal appear thereon. If, then, the other wheel also has a tendency to slip or spin, the other output 9a or 9b respectively, will also have a signal appear thereat. To determine which one of the wheels first has a tendency to slip or spin, that is, first exceeds $V_{Ref}+\lambda$, it is necessary to apply to the speed recognition circuit the reference value $V_{Ref}$. The value $\lambda$ is a fixed additive value, which is automatically added in circuit 11.

Let it be assumed, for example, that the left wheel, at wheel speed $V_1$—see FIG. 2—first slips, or shows a tendency to slip, resulting at a signal on line 9b. This signal will cause a signal to occur from the logic circuit on line 18, and, due to the conjunction, AND-gate 15a will be conductive and the brake control element 14a, associated with the left wheel, will respond, and a braking effect will be applied to the left wheel—see FIG. 2. The output signal of the AND-gate 15a is also applied to the AND-gate 15b, and, provided there is no output signal on line 12a from the comparator 12, the signal will be applied to AND-gate 16a at an inverting input thereof, and thus block the AND-gate 16a, so that, upon subsequent tendency to spin, recognized at the right wheel, the brake control element 14b cannot respond—unless the engine speed has not yet exceeded $n_{min}$, as determined in comparator 12.

The system is symmetrical with respect to both wheels and, thus, the AND-gate 15a is blocked, and the brake control element 14a not operated when first the right wheel has a tendency to spin and slip and $n_{min}$ has not yet been reached.

When the speed $n_{min}$ is reached by the engine speed, both wheels can be controlled with the output from the speed recognition circuit 9 since the line 12a will have a signal thereon and the inverting inputs to the gates 15b, 16b will cause the respective gates to block.

Controlled braking of wheels, to prevent spinning or slipping, is well known within the technology to which the present invention relates, and one embodiment is described in German Patent Disclosure Document No. DE-OS 31 27 301. Braking of the wheel which slips or spins faster is controlled only for a short period of time and until the decrease in engine torque becomes effective.

When both wheels tend to slip, even if the speed $n_{min}$ has not yet been exceeded, it is desirable to decrease engine torque, for example by changing throttle position of the engine. A signal indicating this condition is derived on line 19, that is, a signal from comparator 12 and the logic circuit 10. This signal is applied through the AND-gate 17 to the engine operating control element 13 which, under controlled conditions, changes the energy input to the engine. The AND-gate 17 is blocked below the speed $n_{min}$ by a failure of a signal on line 12a from the comparator 12, so that the engine operating control element 13 cannot respond until the minimum speed of the engine, that is, $n_{min}$, has been reached, and no interference with engine operation will result, thus insuring a sufficiently high speed of the engine for appropriate operation of the vehicle.

I claim:

1. Method of controlling or spinning of driven wheels of a vehicle having a drive engine, to furnish tractive effort and provide drive torque to the driven wheels using the steps of generating driven wheel speed signals ($V_1$, $V_2$) representative of rotary speed of the wheels of the vehicle;

generating a vehicle speed signal ($V_{Ref}$) representative of the speed of movement of the vehicle;

generating a wheel slip signal (9a, 9b) if the rotary speed of any one of the driven wheels indicates that the wheel is slipping or spinning;

controlling the drive torque applied on the driven wheels in a direction to reduce drive torque, and hence wheel speed, in a dependence on presence of a wheel slip signal from at least one of the wheels;

and comprising, in accordance with the invention, the step of applying a braking effort only to that one of the driven wheels which, first provides a wheel slip signal, while leaving another driven wheel uncontrolled and permitting at least initially slippage thereof; and controlling the output torque of the engine in a direction to reduce the output torque of the engine only after the braking effort applied to said one of the driven wheels has resulted in an essential termination of slippage of said one driven wheel.

2. The method of claim 1, wherein the step of applying braking effort to the wheel from which first a wheel slip signal is derived comprises directly braking said driven wheel.

3. The method of claim 1, wherein the step of applying braking effort to that only of the driven wheels from which first the wheel slip signal is derived comprises controlling a no-slip or blocking differential to thereby indirectly apply braking effort, to said drum wheel to which braking effort is being applied.

4. The method of claim 1, further including the step of applying braking effort to the other wheel at a higher speed range than the driven wheel speed of the wheel which is first braked.

5. The method of claim 1 further including the step of generating a driven wheel speed reference level ($V_x$); and wherein the step of controlling the output torque of the engine in a direction to reduce engine output torque only when said another driven wheel which was, at least initially, uncontrolled, has reached a speed above the speed reference level ($V_x$).

6. The method of claim 1 including the step of sensing engine speed, and deriving an engine speed signal (n);

and wherein the step of controlling the output torque of the engine in a direction to reduce the output torque comprises controlling the output torque in said direction to reduce the output torque of the engine only after the engine has reached a predetermined engine speed level ($n_{min}$).

7. Method of claim 1 including the step of generating a driven wheel speed reference level ($V_x$); and wherein the step of applying braking effort to set another driven wheel which, at least initially, was permitted to slip, when said another driven wheel has reached the predetermined speed reference level ($V_x$).

8. Control apparatus to control slippage or spinning of driven wheels of a vehicle driven by an engine, to maintain tractive effort comprising:

means providing a first wheel speed signal ($V_1$) representative of the speed of a driven wheel;

means providing a second wheel speed signal ($V_2$) representative of the wheel speed of another driven wheel;

means (11) providing a speed reference signal;

means for recognizing which ones of the driven wheel speed signals exceed the reference speed signal;

and logic circuit means (15a, 15b, 16a, 16b) applying a braking effort to that one of the wheels which is recognized as having a speed in excess of the reference speed, while inhibiting applying a braking effort to the other driven wheel or wheels supplying the other driven wheel speed signal.

9. Apparatus according to claim 8, including means (12) determining engine speed, and deriving an engine speed signal (12a) when the engine speed exceeds a certain predetermined limit;

and means (10, 17, 13) for controlling the operation of the engine in a direction to reduce engine torque only when the speed of the engine has reached a predetermined level as represented by said engine speed signal.

10. Apparatus according to claim 9, wherein the logic circuit means are coupled to receive the engine speed signal and permit application of braking effort also to the other driven wheel from which the other speed signal is derived when the engine speed has exceeded said predetermined speed level as represented by said engine speed signal.

* * * * *